United States Patent [19]

Monchalin

[11] Patent Number: 5,402,235
[45] Date of Patent: Mar. 28, 1995

[54] IMAGING OF ULTRASONIC-SURFACE MOTION BY OPTICAL MULTIPLEXING

[75] Inventor: Jean-Pierre Monchalin, Montreal, Canada

[73] Assignee: National Research Council of Canada, Ottawa, Canada

[21] Appl. No.: 84,584

[22] Filed: Jul. 1, 1993

[51] Int. Cl.⁶ .............................................. G01B 9/02
[52] U.S. Cl. .................................. 356/357; 356/352; 356/432
[58] Field of Search ............... 356/352, 357, 358, 359, 356/360, 432 T, 35.5, 349; 73/655, 657

[56] References Cited

U.S. PATENT DOCUMENTS

| | | | |
|---|---|---|---|
| 4,121,470 | 10/1978 | Raule | 356/358 |
| 5,131,748 | 7/1992 | Monchalin et al. | 356/349 |
| 5,137,361 | 8/1992 | Heon et al. | 356/352 |

*Primary Examiner*—Samuel A. Turner

[57] ABSTRACT

The invention relates to method and apparatus for optically detecting transient motion from a scattering surface. A broad laser beam is directed on to an area of the scattering surface of an object to be imaged to thereby scatter the laser beam and produce a plurality of modulated signals. A demodulator simultaneously demodulates the modulated signals to provide a plurality of demodulated signals to an array or matrix of detectors. The detector array simultaneously converts the demodulated light signals into electrical signals representative of the transient motion. The optical detection technique according to the invention is particularly useful for detecting small deformations produced by ultrasound, in a timely manner by parallel processing information provided by a matrix of detectors.

18 Claims, 8 Drawing Sheets

IMAGING OF ULTRASONIC-SURFACE MOTION BY OPTICAL MULTIPLEXING

FIELD OF THE INVENTION

The invention generally relates to a method and apparatus for optically detecting transient motion from a scattering surface. More particularly, the invention relates toward detecting optical phase modulations such as those produced by ultrasound and producing an image of this motion over the surface as well as producing an ultrasonic image of the object excited by ultrasound.

BACKGROUND OF THE INVENTION

The detection of phase modulation or frequency modulation of an optical wave is important from various fields of application where optical beams are used to detect the motion of objects. This is the case of laser sensing of vibrations and laser detection of ultrasound and of transient body deformations such as those produced by a shock or impact. Of particular interest for practical applications is the case where ultrasound or a shock wave is generated by a laser. In this case, a completely remote ultrasonic inspection system can be realized, permitting for example ultrasonic probing at elevated temperatures. A technique based on laser generation and optical detection can thus be advantageously used to inspect materials at high temperatures (such as all metals and ceramics) for process and quality control, to detect flaws as soon as they are created during processing, to measure production parameters such as thickness, temperature, etc. and to determine micro structural properties on-line (grain size, porosity, etc.) This technique is also particularly advantageous to inspect parts of complex shapes such as those made of polymer matrix composite materials and used in advanced aeronautic and aerospace structures.

In all cases of practical interest, ultrasonic excitation of the object produces at its surface, very small displacements that translate into correspondingly very small phase or frequency perturbations. Therefore, a sensitive detection technique has to be used, which means in practice a technique based on optical interferometry. Since in practice, the probed surfaces are rough, the ultrasonic information is encoded into an optical beam with speckle and a suitable interferometric technique should integrate effectively over the whole speckle field or provide demodulation independently of speckle nature of the collected light beam. In various U.S. patents, Applicant has described interferometric schemes for sensitive detection in these conditions. All of these schemes are characterized by their large étendue parameter.

This étendue parameter (or throughput), is defined as the product of its effective entrance aperture area by the solid angle limited by the rays of maximum inclination passing through the entrance aperture center and thus defining the field of view. The maximum inclination rays can be defined as those which produce a shift of the interference pattern by a quarter of a fringe. The importance of the étendue parameter stems from its invariance within the frame of geometric optics. A large étendue permits to choose light collecting optics of large size, being only limited by cost and practical feasibility, and to detect surface motion over a large area.

In an arrangement described by the applicant in U.S. Pat. No. 4,659,224 issued Apr. 21, 1987, entitled Optical Interferometric Reception of Ultrasonic Energy, a confocal Fabry-Perot is used in transmission to provide a signal representative of the surface motion independently of the speckle effect. In U.S. Pat. No. 4,966,459 issued Oct. 30, 1990, entitled Broadband Optical Detection of Transient Surface Motion From a Scattering Surface, the applicant describes the use of the same type of interferometer, that may be used within a Mach-Zehnder interferometric arrangement or in a reflection scheme to provide the same capability with a very broad detection bandwidth. Still a broader detection bandwidth, especially including the low ultrasonic frequency range, several KHz to about 1 MHz, is described by the applicant and R. K. Ing in U.S. Pat. No. 5,131,748 issued Jul. 21, 1992, entitled Broadband Optical Detection of Transient Motion from a Scattering Surface that is based on the use of two-wave mixing in a photorefractive crystal.

Although the prior art described performs its intended function adequately, it only provides information relating to a single location on the surface of the object. In order to obtain an ultrasonic image of the object representative of a property of interest, such as thickness, porosity, microstructure, presence and location of flaws, the detection laser beam is usually scanned with a rotating mirror over the surface of the object. Alternatively the object can be moved in front of the laser beam. Although such an approach works properly, it is slow and can take precious time if a large surface area is to be scanned. The present application describes a method and apparatus that can generate an ultrasonic image of the object without using optical scanning and can simultaneously detect signals originating from multiple spots on the surface of an object.

SUMMARY OF THE INVENTION

It is an object of the invention to seek to overcome this limitation by providing a method and apparatus for simultaneous detection of a plurality of signals representative of the transient motion of an excited object.

According to one aspect of the invention an apparatus for detecting transient motion from a scattering surface is provided. The apparatus comprises: means for generating a laser beam onto the scattering surface to thereby scatter the laser beam and produce a plurality of signals in the form of modulated signals; means for simultaneously demodulating a plurality of the modulated signals to produce demodulated signals which are representative of the transient motion; and detector means for simultaneously detecting the demodulated signals and for converting them into electrical signals representative of the transient motion.

According to another aspect of the invention a method is provided for detecting transient motion from a scattering surface. The method comprises the steps of: directing a laser beam onto the scattering surface to thereby scatter the laser beam and produce a plurality of signals in the form of modulated signals; simultaneously demodulating a plurality of the modulated signals to produce demodulated signals which are representative of the transient motion; and, simultaneously detecting the demodulated signals and convening them into electrical signals representative of the transient motion.

By the expression "transient motion" it is meant a motion having a non-zero acceleration. Such an expression thus includes all oscillating motions, but excludes motions of constant velocities.

This invention is particularly useful for rapid imaging of small surface deformations or displacements of a material subjected to ultrasonic energy.

BRIEF DESCRIPTION OF THE DRAWINGS

Exemplary embodiments of the invention will now be described in conjunction with the drawings in which.

DETAILED DESCRIPTION OF THE DRAWINGS

Figure 1:
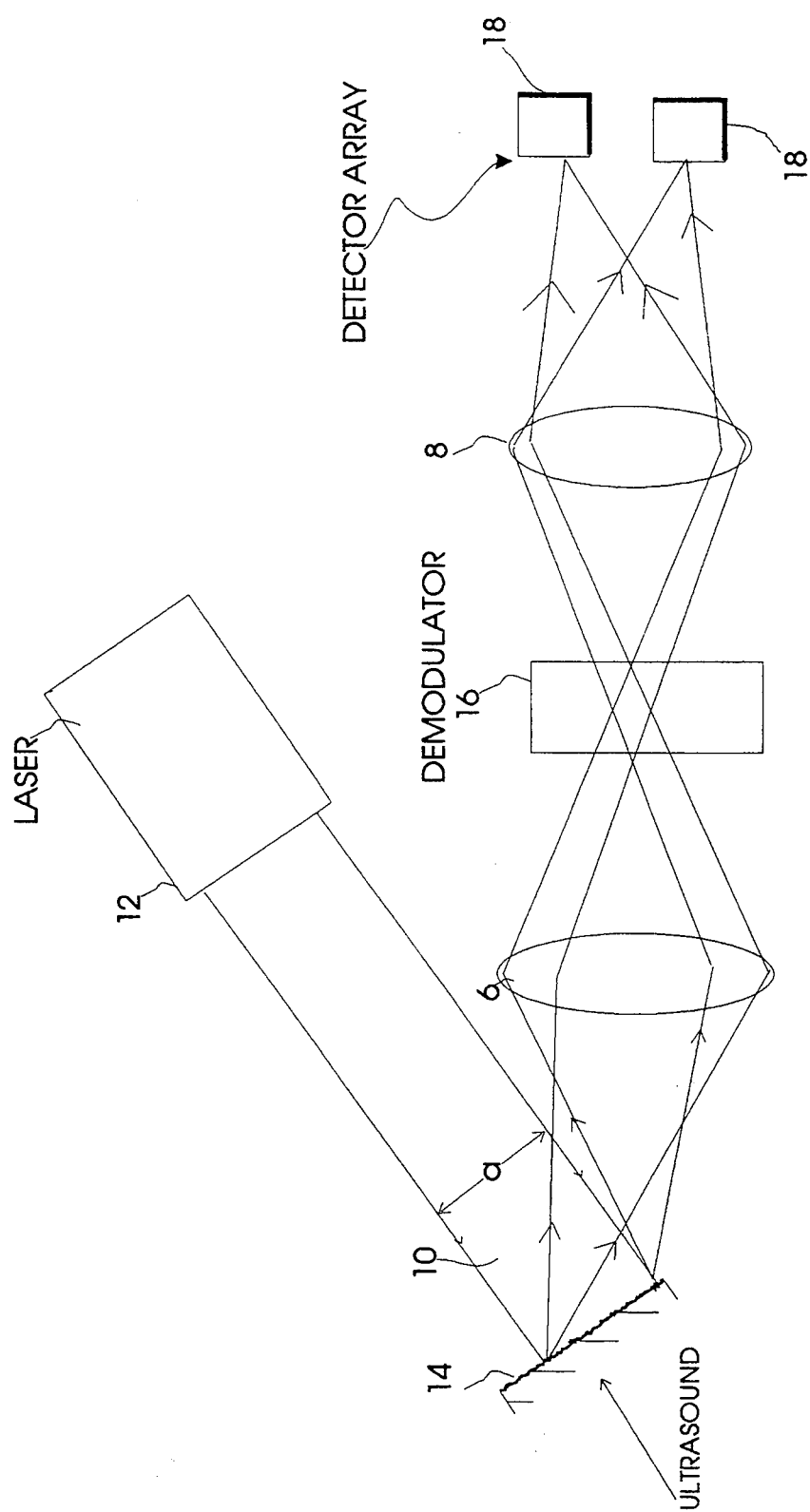
FIG. 1 is a schematic block diagram illustrating a first embodiment of an imaging apparatus including an array of detectors in accordance with the invention.
Figure 7A:
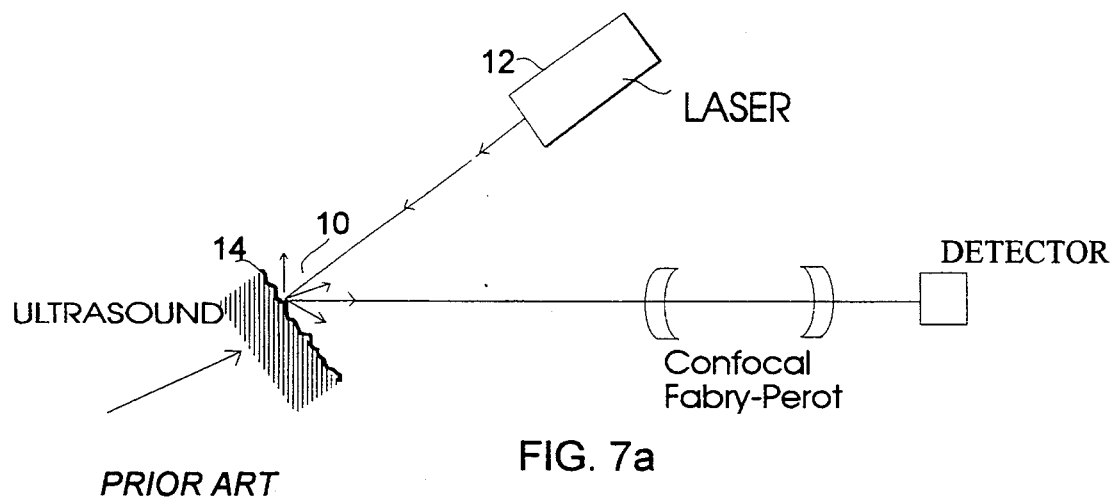
FIGS. 7a and 7b are a prior art schematic diagrams of imaging apparatus having a Fabry-Perot arrangement to provide a signal representative of transient motion on the surface of a workpiece; and, FIG. 7c is a prior art schematic diagram of imaging apparatus having a nonlinear or photorefractive crystal as a demodulator.
Figure 7B:
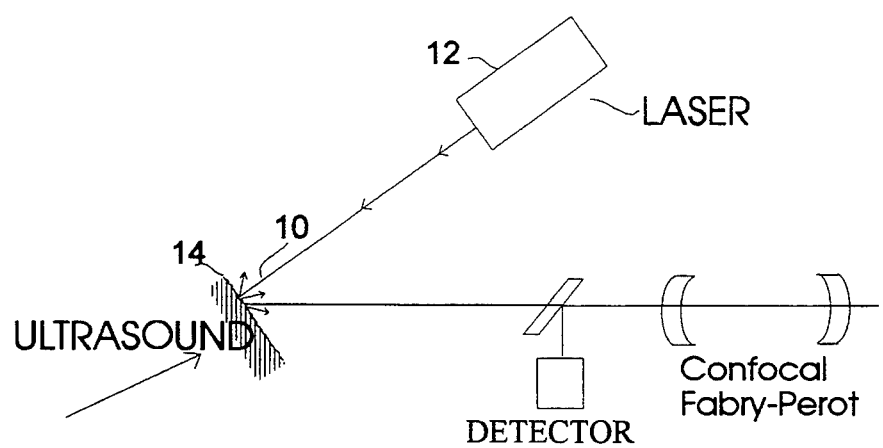
Figure 7C:
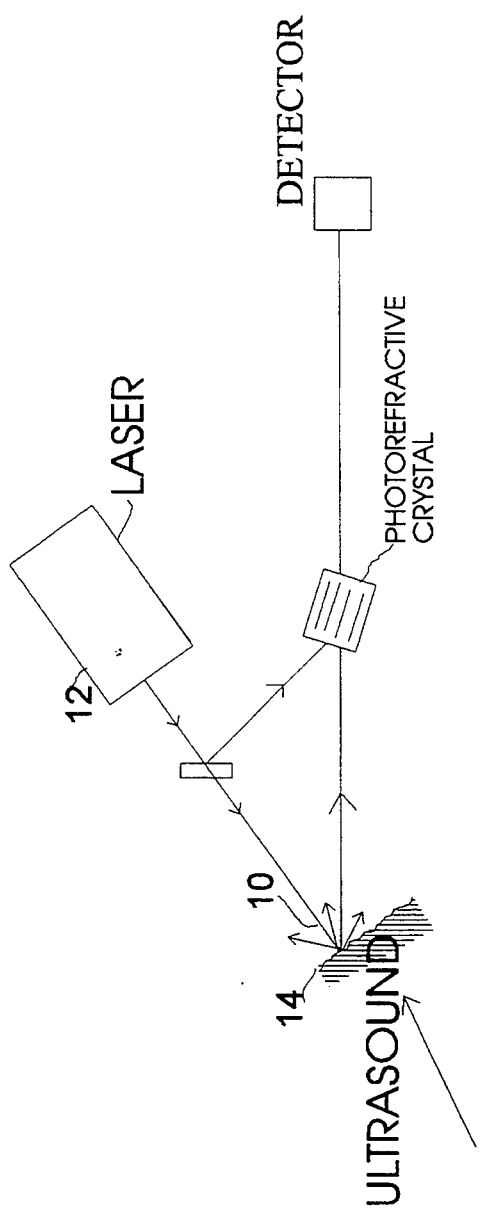

Referring first to FIG. 1, a broad laser beam 10 generated from a laser source 12 is directed onto a surface 14 of a material or workpiece subjected to ultrasonic energy. The ultrasonic displacement of the surface 14 probed by the broad laser beam 10 can be produced by an ultrasonic piezoelectric transducer or other means such as electrical discharge, projectile impact or high intensity laser pulse; it can also occur naturally in strained material. As the broad laser beam 10 having an area a impinges on the surface 14, it is scattered by the surface, the scattered laser beam thus produced being phase or frequency modulated by the ultrasonic surface motion of the object. A demodulator 16 in the form of a detecting interferometer with a large étendue demodulates the frequency or phase shift produced by the ultrasonic motion. The demodulator block 16 may be a two-wave type or a multi-wave type. Applicant, in a paper entitled *Optical Detection of Ultrasound* published in the IEEE Transactions on Sonics, Ultrasonics and Frequency Control, UFFC-33, pp. 485–499 (1986), describes the two-wave type of interferometer. The confocal Fabry-Pérot interferometer is described by the applicant in U.S. Pat. No. 4,659,224 entitled "Optical Interferometric Reception of Ultrasonic Energy" and in U.S. Pat. No. 4,966,459 entitled "Broadband Optical Detection of Transient Surface Motion from a Scattering Surface". Similarly an interferometric arrangement based on two-wave mixing in a photorefractive or non-linear crystal can be used. A suitable configuration has been described by the applicant and R. K. Ing in U.S. Pat. No. 5,131,748 issued Jul. 21, 1992, entitled Broadband Optical Detection of Transient Motion from a Scattering Surface by Two-Wave Mixing in a Photorefractive Crystal. One embodiment of this system is shown in FIG. 7c. Alternatively, FIGS. 7a, and 7b show two other prior art systems having confocal Fabry-Pérot interferometers.

Referring again to FIG. 1, and for the purpose of illustration, only two points of an infinite number of points on the surface within the area a of the broad beam 10 are shown. Detection means in the form of an array of detectors are positioned behind the demodulator 16 to receive demodulated signals provided by the demodulator. Each detector 18 in the array, detects information relating to a particular location or subarea within the surface area a. This is somewhat analogous to an image recorded by a camera stored into a discrete number of pixels. In this invention, an area a of the scattering surface 14 is illuminated by the broad beam laser 12. The resultant scattered beam containing information relating to the surface 14 of area a is demodulated and an array of n detectors simultaneously detects information relating to n separate subareas within the illuminated area a. Advantageously, the array of detectors 18 provides means for simultaneously detecting and converting into electrical signals the demodulated information bearing signals.

Since the illuminating broad laser beam 10 may not have a perfectly uniform intensity distribution and since the light reflection or scattering properties of the surface 14 may vary across the observed area a, electronic circuitry is used to normalize the signal of each detector to the amount of light received by the detector. This can be conveniently performed by using capacitive coupling to separate the DC output of the detector representative of the collected light from its AC output. Both outputs can be digitally sampled. After division of the AC signal by the DC signal, a normalized signal, representative of the surface transient or ultrasonic motion is obtained. Alternatively, the laser beam can be phase modulated at a given modulation frequency and transient surface motion signal can be separated from the additional phase modulation signal with suitable RF filters after detection. This is described in the applicant's U.S. Pat. No. 4,659,224 issued Apr. 21, 1987, entitled Optical Interferometric Reception of Ultrasonic Energy. The additional modulation signal is then rectified to provide a DC signal to be used for normalization as described above.

In FIG. 1, the optical system includes first and second lenses 6 and 8 respectively for focusing or steering the scattered beam toward the detectors 18. The first lens 6 is positioned intermediate the scattering surface 14 and the demodulator 16; the second lens 8 is positioned intermediate the detector array 18 and the demodulator 16. The scattered beam comprising a plurality of composite signals bearing information relating to the entire area a of the surface 14 is demodulated and presented to the detector array or matrix. A unique signal representative of the transient motion of a particular sub-area on the scattering surface is presented to each detector and is processed independently of the other detectors; thus, the arrangement shown in FIG. 1 allows parallel processing or simultaneous detection of a plurality of signals. Of course, the detection resolution increases as the number n of detectors and number n of sub-areas in the area a increases. Since there is a one-to-one mapping between a sub-area or spot within the area a and a detector, decreasing the size of the spot that is mapped to each detector in effect yields a more precise result with more information per unit of area. This would be analogous to decreasing the pixel size in a scanned image to provide a higher definition image.

Figure 2:
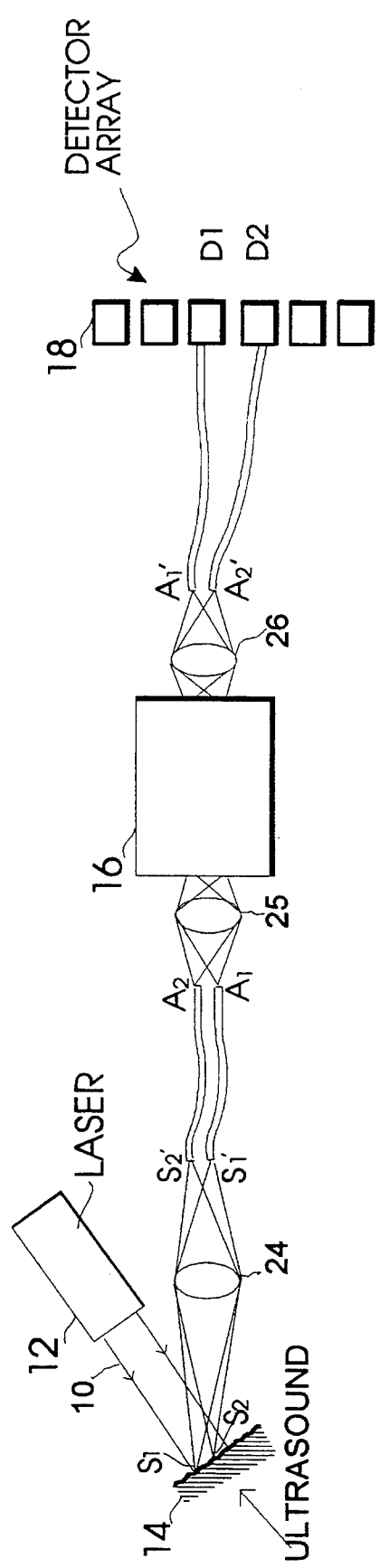
FIG. 2 is a schematic block diagram illustrating a second embodiment of an imaging apparatus including optical fibers for guiding signals to an array of detectors in accordance with the invention.
Figure 3A:
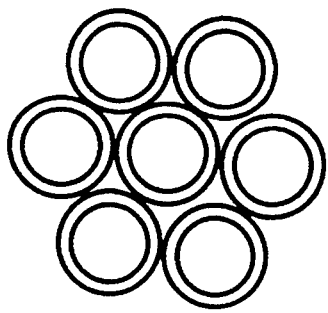
FIGS. 3a and 3b are end views of closely packed optical fibers.
Figure 3B:
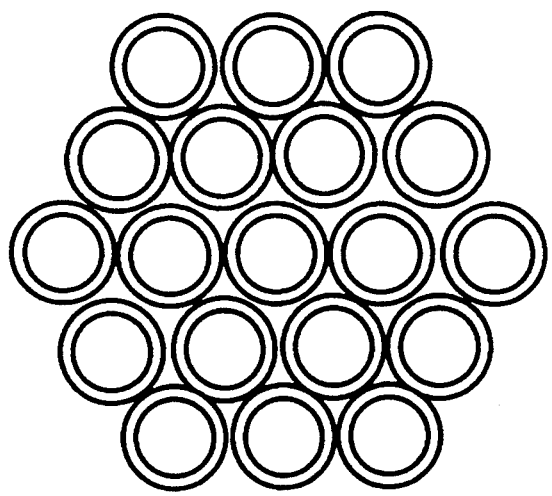

Now referring to FIG. 2 a broad laser beam 10 generated from a laser source 12 is directed onto the surface of a material or workpiece 14 subjected to ultrasonic energy. The arrangement shown in FIG. 2 is similar to that of FIG. 1 however, two lenses 24 and 25 are positioned intermediate the demodulator 16 and the workpiece 14. The lenses serve as a focusing means to assist in guiding the signals to the demodulator 16. Optical wave guide means in the form of a pair of optical fibers are located intermediate lenses 24 and 25 and provide a suitable transmission medium for signals to be carried to the demodulator. For the sake of clarity, only two optical fibers have been shown; however, in a preferred arrangement, a plurality of fibers in excess of two is provided for carrying the same number of channels to a corresponding number of detectors 18. A lens 26 is positioned between the array or matrix of detectors 18 and the interferometric demodulator 16. A second pair of optical fibers located intermediate detectors $D_1$ and $D_2$ and the lens 26 receive signals representative of the transient motion on the surface of the workpiece 14. Bundles of optical fibers or optical wave guides may be particularly convenient in an industrial environment where the laser source, the demodulating interferometer and/or the detectors or inspection area may be far away from one another. Furthermore, the optical fibers may be closely packed as shown in FIGS. 3a and 3b for providing direct coupling (not shown) between the workpiece and the demodulator. Close-packing is advantageous since any interferometric detection system has limited étendue. Optical fibre coupling in front of the interferometer provides for widely separated probed spots without increasing the étendue of the beam at the interferometer entrance. In addition, optical fiber coupling after the demodulator allows the geometrical arrangement of the detectors within the array or matrix to be completely independent of the geometrical arrangement of the detection channels inside the demodulator or the spots on the surface.

Figure 4:
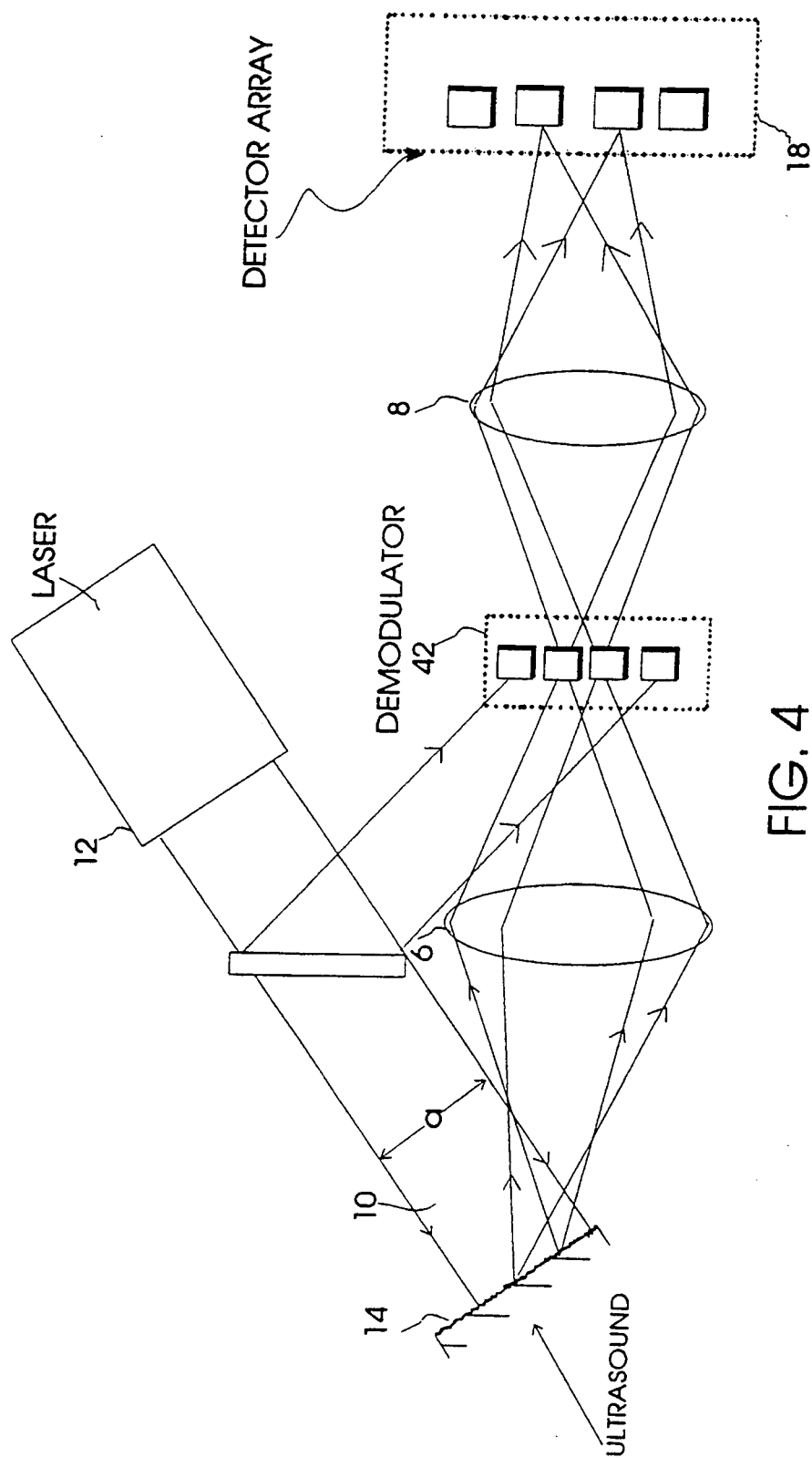
FIG. 4 is a schematic block diagram of an embodiment of imaging apparatus having an array of photorefractive crystals, in accordance with the invention.

FIG. 4 shows another embodiment of the invention where the detecting interferometer has been segmented in as many elements as detection channels. This can be implemented by using two-wave mixing on a photorefractive wafer upon which separate zones have been etched or by using an ensemble of small photorefractive crystals 42 or nonlinear crystals. As shown in FIG. 4, all these crystals are illuminated by the broad area pump beam directly derived from the laser source 12. These crystals are then imaged onto the detector array or matrix 18.

Figure 5:
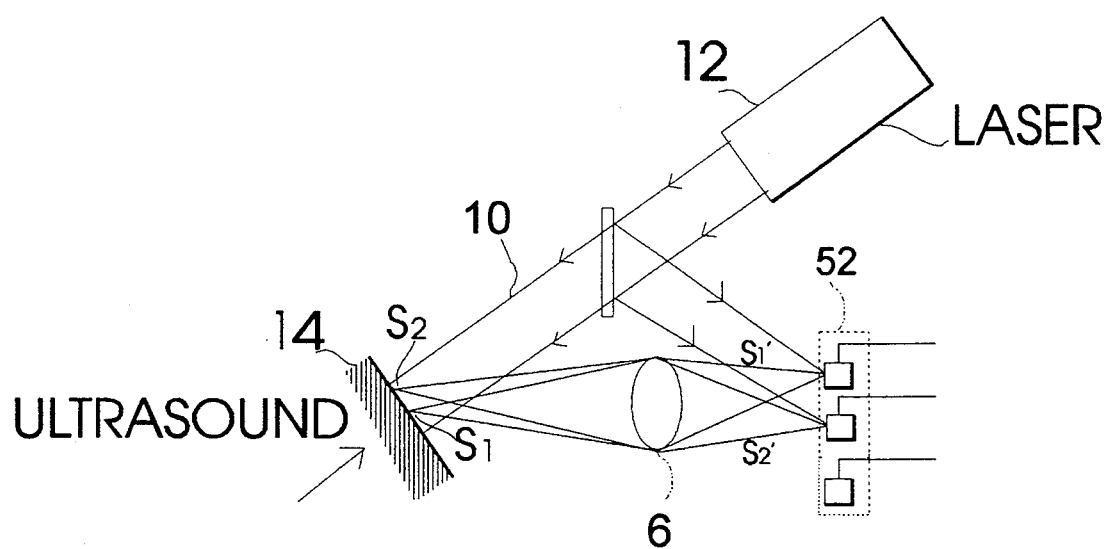
FIG. 5 is a schematic block diagram of an embodiment of imaging apparatus having an array of photorefractive crystals, similar to the embodiment shown in FIG. 4, however, having electrical leads attached for carrying detection signals, in accordance with the invention.

I. A. Sokolov, S. I. Stepanov and G. S. Trofimov, in the Journal Opt. Soc. Am B/Vol. 9, No. 1/January 1992, p.p. 173–176 disclose the detection of a small alternating current through a short circuited sample of a photorefractive crystal that is illuminated by a vibrating pattern of interference between two waves. The current produced corresponds to the optical phase modulation in the information bearing signal contained within the interference pattern illuminating the photorefractive crystal. Referring now to FIG. 5, an array of photorefractive crystals 52 is shown in accordance with the invention in an alternative embodiment. The use of several photorefractive crystals each having a lead attached for carrying current, allows simultaneous demodulation and simultaneous detection of a plurality of signals. In this arrangement, each crystal demodulates and detects a signal corresponding to a particular sub-area within the area a on the scattering surface.

Figure 6:
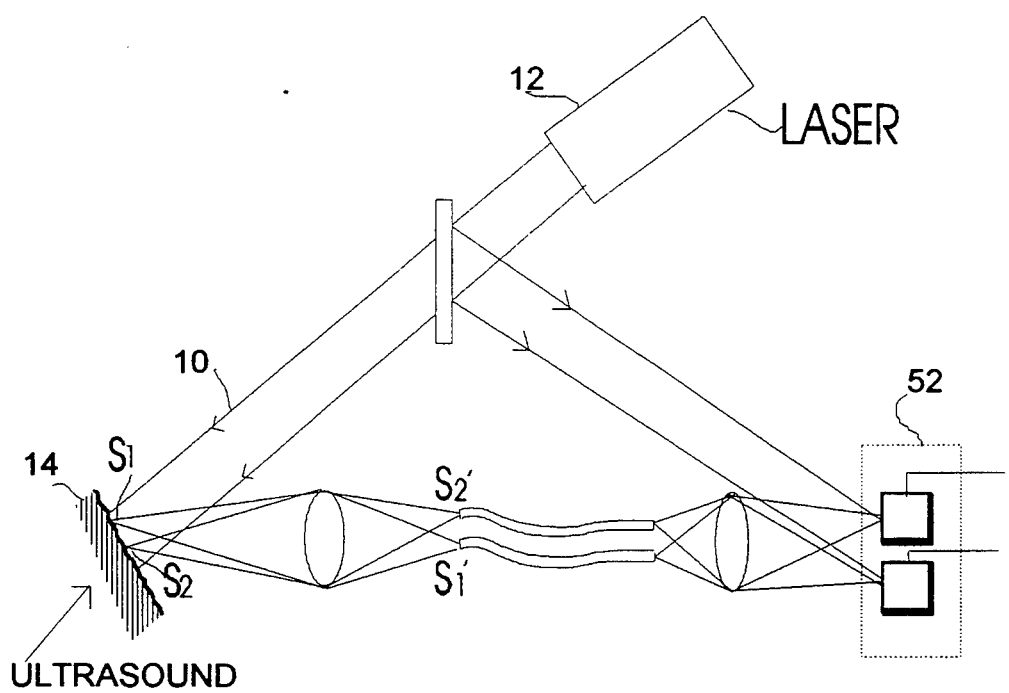
FIG. 6 is a schematic block diagram of an embodiment of imaging apparatus having optical fibers for guiding signals to an array of photorefractive crystals.

Of course, an embodiment using an optical fiber link as shown in FIG. 6 provides additional flexibility providing probed spots distributed on the probed surface differently from the detecting elements.

It should further be realized that numerous other embodiments may be considered without departing from the scope of the invention.

What I claim is:

1. An apparatus for detecting transient motion from a scattering surface comprising:
   means for generating a beam of coherent light onto the scattering surface to thereby scatter the laser beam;
   means for collecting and dividing the scattered light into a plurality of modulated optical signals;
   means for simultaneously demodulating a plurality of the modulated signals to produce demodulated signals which are representative of the transient motion; and,
   detector means for simultaneously detecting the demodulated signals and for converting them into electrical signals representative of the transient motion.

2. An apparatus as defined in claim 1 wherein the detector means is in the form of an array of detectors.

3. An apparatus as defined in claim 1 wherein the means for simultaneously demodulating is in the form of a plurality of segmented demodulators.

4. An apparatus as defined in claim 3 wherein the segmented demodulators are in the form of non-linear crystals.

5. An apparatus as defined in claim 4 wherein the non-linear crystals are photorefractive crystals.

6. An apparatus as defined in claim 2 wherein each detector is configured to detect demodulated signals independent of the other detectors.

7. An apparatus as defined in claim 2 wherein the means for collecting and dividing scattered light comprises optical wave guide means intermediate the scattering surface and the demodulating means.

8. An apparatus as defined in claim 7 wherein the optical wave guide means comprises a plurality of optical fibers, each of the fibers having an end proximate to the scattering surface and an other end proximate to the demodulating means.

9. An apparatus for detecting transient motion from a scattering surface comprising:
   means for generating a beam of coherent light onto the scattering surface to thereby scatter the laser beam;
   means for collecting and dividing the scattered light into a plurality of modulated optical signals: and,
   means for simultaneously demodulating a plurality of the modulated signals to produce demodulated signals which are representative of the transient motion and for simultaneously converting the demodulated signals into electrical signals representative of the transient motion.

10. An apparatus as defined in claim 9 wherein the means for simultaneously demodulating and for simultaneously detecting comprises a plurality of non-linear crystals.

11. An apparatus as defined in claim 9 wherein the means for simultaneously demodulating and for simultaneously detecting comprises a plurality of photorefractive crystals.

12. An apparatus for detecting transient motion from a scattering surface comprising:
   means for generating a beam of coherent light onto the scattering surface to thereby scatter the laser beam and produce a plurality of signals in the form of modulated signals;
   means for simultaneously demodulating a plurality of the modulated signals to produce demodulated signals which are representative of the transient motion, said means being in the form of a plurality of segmented demodulators; and,
   detector means in the form of an array of detectors for simultaneously detecting the demodulated signals and for converting them into electrical signals representative of the transient motion.

13. An apparatus as defined in claim 12 wherein the segmented demodulators are in the form of non-linear crystals.

14. An apparatus as defined in claim 13 wherein the non-linear crystals are photorefractive crystals.

15. An apparatus for detecting transient motion from a scattering surface comprising:
   means for generating a beam of coherent light onto the scattering surface to thereby scatter the laser beam and produce a plurality of signals in the form of modulated signals;
   means for simultaneously demodulating a plurality of the modulated signals to produce demodulated signals which are representative of the transient motion;
   optical wave guide means intermediate the scattering surface and the demodulating means; and,
   detector means in the form of an array of detectors for simultaneously detecting the demodulated signals and for converting them into electrical signals representative of the transient motion.

16. An apparatus as defined in claim 15 wherein the optical wave guide means comprises a plurality of optical fibers, each of the fibers having an end proximate to the scattering surface and an other end proximate to the demodulating means.

17. An apparatus for detecting transient motion from a scattering surface comprising:
   means for generating a beam of coherent light onto the scattering surface to thereby scatter the laser beam and produce a plurality of signals in the form of modulated signals; and,
   a plurality of non-linear crystals for simultaneously demodulating a plurality of the modulated signals to produce demodulated signals which are representative of the transient motion and for simultaneously converting the demodulated signals into electrical signals representative of the transient motion.

18. An apparatus as defined in claim 17 wherein the means for simultaneously demodulating and for simultaneously detecting comprises a plurality of photorefractive crystals.

* * * * *